United States Patent
Chandran et al.

(10) Patent No.: US 9,725,663 B2
(45) Date of Patent: Aug. 8, 2017

(54) INTEGRATED TWO-STAGE THERMOCHEMICAL HEAT PIPE REACTOR HAVING A PARTITIONED VESSEL

(71) Applicant: ThermoChem Recovery International, Inc., Baltimore, MD (US)

(72) Inventors: Ravi Chandran, Ellicot City, MD (US); Daniel Michael Leo, Baltimore, MD (US); Shawn Robert Freitas, Corvallis, OR (US)

(73) Assignee: THEMOCHEM RECOVERY INTERNATIONAL, INC., Baltimore, MD (US)

(*) Notice: Subject to any disclaimer, the term of this patent is extended or adjusted under 35 U.S.C. 154(b) by 201 days.

(21) Appl. No.: 14/652,967

(22) PCT Filed: Jan. 22, 2013

(86) PCT No.: PCT/US2013/022520
§ 371 (c)(1),
(2) Date: Jun. 17, 2015

(87) PCT Pub. No.: WO2014/116203
PCT Pub. Date: Jul. 31, 2014

(65) Prior Publication Data
US 2015/0315499 A1 Nov. 5, 2015

(51) Int. Cl.
*C10J 3/84* (2006.01)
*B01J 8/26* (2006.01)
(Continued)

(52) U.S. Cl.
CPC .............. *C10J 3/721* (2013.01); *B01J 8/0055* (2013.01); *B01J 8/26* (2013.01); *C10J 3/466* (2013.01);
(Continued)

(58) Field of Classification Search
CPC .................................................... C10J 2300/12
See application file for complete search history.

(56) References Cited

U.S. PATENT DOCUMENTS 4,052,140 A 10/1977 Highley
4,474,230 A 10/1984 McCallister
(Continued)

FOREIGN PATENT DOCUMENTS

CN 100358974 C 1/2008
GB 1 599 398 9/1981

OTHER PUBLICATIONS

International Search Report dated Mar. 26, 2013 issued in PCT counterpart application (No. PCT/US2013/022520).
(Continued)

*Primary Examiner* — Matthew Merkling
(74) *Attorney, Agent, or Firm* — Womble Carlyle (57) ABSTRACT

A feedstock conversion system including an integrated two-stage fluid bed thermochemical reaction apparatus (50) has first and second reaction chambers (110, 120) side-by-side and physically separated from one another in one vessel (100) by a partition (130). One or more clusters of heat pipes (400) pass through the partition (130) between the first and second chambers (110, 120) for efficient indirect heat transfer between first and second fluid bed reaction stages (200, 300) and materials therein. The system includes devices for solids transfer between the two reaction chambers (110, 120) to enhance feedstock conversion.

22 Claims, 6 Drawing Sheets

(51) Int. Cl.
    *C10J 3/72*         (2006.01)
    *C10J 3/46*         (2006.01)
    *C10J 3/48*         (2006.01)
    *B01J 8/00*         (2006.01)
    *F28D 15/02*       (2006.01)
    *F28D 15/04*       (2006.01)

(52) U.S. Cl.
    CPC ................ *C10J 3/485* (2013.01); *C10J 3/84* (2013.01); *F28D 15/0275* (2013.01); *F28D 15/046* (2013.01); *B01J 2208/00132* (2013.01); *C10J 2200/15* (2013.01); *C10J 2300/12* (2013.01)

(56) References Cited

U.S. PATENT DOCUMENTS

| | | | |
|---|---|---|---|
| 5,066,627 | A | 11/1991 | Owen et al. |
| 5,666,801 | A | 9/1997 | Rohrer |
| 7,087,097 | B1 | 8/2006 | Karl |
| 7,094,264 | B2 | 8/2006 | Steer |
| 2010/0158794 | A1 | 6/2010 | Steer |
| 2012/0111109 | A1 | 5/2012 | Chandran et al. |
| 2013/0056685 | A1* | 3/2013 | Badhe ................ C10J 3/18 252/373 |

OTHER PUBLICATIONS

Written Opinion dated Mar. 26, 2013 issued in PCT counterpart application (No. PCT/US2013/022520).
International Preliminary Report on Patentability (IPRP) dated May 1, 2015 issued in PCT counterpart application (No. PCT/US2013/022520).

* cited by examiner

| EMBODIMENT | COMBINATION | |
|---|---|---|
| | STAGE 1 | STAGE 2 |
| 1001 | HYDROUS DEVOLATILIZATION | PARTIAL OXIDATION, STEAM REFORMING |
| 1002 | HYDROUS DEVOLATILIZATION | PARTIAL OXIDATION, DRY REFORMING |
| 1003 | HYDROUS DEVOLATILIZATION | PARTIAL OXIDATION, STEAM REFORMING, DRY REFORMING |
| 1004 | HYDROUS DEVOLATILIZATION | COMBUSTION |
| 1005 | STEAM REFORMING | PARTIAL OXIDATION, STEAM REFORMING |
| 1006 | STEAM REFORMING | PARTIAL OXIDATION, DRY REFORMING |
| 1007 | STEAM REFORMING | PARTIAL OXIDATION, STEAM REFORMING, DRY REFORMING |
| 1008 | STEAM REFORMING | COMBUSTION |
| 1009 | PARTIAL OXIDATION | PARTIAL OXIDATION, STEAM REFORMING |
| 1010 | PARTIAL OXIDATION | PARTIAL OXIDATION, DRY REFORMING |
| 1011 | PARTIAL OXIDATION | PARTIAL OXIDATION, STEAM REFORMING, DRY REFORMING |
| 1012 | PARTIAL OXIDATION | COMBUSTION |
| 1013 | DRY REFORMING | PARTIAL OXIDATION, STEAM REFORMING |
| 1014 | DRY REFORMING | PARTIAL OXIDATION, DRY REFORMING |
| 1015 | DRY REFORMING | PARTIAL OXIDATION, STEAM REFORMING, DRY REFORMING |
| 1016 | DRY REFORMING | COMBUSTION |
| 1017 | STEAM REFORMING, DRY REFORMING | PARTIAL OXIDATION, STEAM REFORMING |
| 1018 | STEAM REFORMING, DRY REFORMING | PARTIAL OXIDATION, DRY REFORMING |
| 1019 | STEAM REFORMING, DRY REFORMING | PARTIAL OXIDATION, STEAM REFORMING, DRY REFORMING |
| 1020 | STEAM REFORMING, DRY REFORMING | COMBUSTION |
| 1021 | PARTIAL OXIDATION, STEAM REFORMING | PARTIAL OXIDATION, STEAM REFORMING |
| 1022 | PARTIAL OXIDATION, STEAM REFORMING | PARTIAL OXIDATION, DRY REFORMING |
| 1023 | PARTIAL OXIDATION, STEAM REFORMING | PARTIAL OXIDATION, STEAM REFORMING, DRY REFORMING |
| 1024 | PARTIAL OXIDATION, STEAM REFORMING | COMBUSTION |
| 1025 | PARTIAL OXIDATION, DRY REFORMING | PARTIAL OXIDATION, STEAM REFORMING |
| 1026 | PARTIAL OXIDATION, DRY REFORMING | PARTIAL OXIDATION, DRY REFORMING |
| 1027 | PARTIAL OXIDATION, DRY REFORMING | PARTIAL OXIDATION, STEAM REFORMING, DRY REFORMING |
| 1028 | PARTIAL OXIDATION, DRY REFORMING | COMBUSTION |
| 1029 | PARTIAL OXIDATION, STEAM REFORMING, DRY REFORMING | PARTIAL OXIDATION, STEAM REFORMING |
| 1030 | PARTIAL OXIDATION, STEAM REFORMING, DRY REFORMING | PARTIAL OXIDATION, DRY REFORMING |
| 1031 | PARTIAL OXIDATION, STEAM REFORMING, DRY REFORMING | PARTIAL OXIDATION, STEAM REFORMING, DRY REFORMING |
| 1032 | PARTIAL OXIDATION, STEAM REFORMING, DRY REFORMING | COMBUSTION |

INTEGRATED TWO-STAGE THERMOCHEMICAL HEAT PIPE REACTOR HAVING A PARTITIONED VESSEL

RELATED APPLICATIONS

This is a 35 USC 371 U.S. National Phase of International Application No. PCT/US2013/022520, filed 22 Jan. 2013 and published in English as WO 2014/116203A1 on 31 Jul. 2014. The contents of the aforementioned application are incorporated by reference in their entirety.

FIELD OF INVENTION

The current invention is directed towards a carbonaceous feedstock conversion system having two reaction compartments.

BACKGROUND OF THE INVENTION

As used herein the term "carbonaceous feedstock" is a material that has "fixed carbon feedstock components" and "volatile feedstock components".

As used herein the term "fixed carbon feedstock components" refers to feedstock components present in a carbonaceous feedstock other than volatile feedstock components, contaminants, ash or moisture. Fixed carbon feedstock components are usually solid combustible residue remaining after the removal of moisture and volatile feedstock components from a carbonaceous feedstock.

As used herein the term "volatile feedstock components" refers to components within a carbonaceous feedstock other than fixed carbon feedstock components, contaminants, ash or moisture.

As used herein the term "product gas" refers to volatile reaction products, syngas, or flue gas discharged from a thermochemical reactor undergoing thermochemical processes including hydrous devolatilization, steam reforming, partial oxidation, dry reforming, or combustion.

As used herein the term "syngas" refers to a gaseous mixture containing carbon monoxide (CO), hydrogen ($H_2$), and other vapors/gases, also including char, if any and usually produced when a carbonaceous material reacts with steam ($H_2O$), carbon dioxide ($CO_2$) and/or oxygen ($O_2$). While steam is the reactant in steam reforming, $CO_2$ forms the reactant in dry reforming. Generally, for operation at a specified temperature, the kinetics of steam reforming is faster than that of dry reforming and so steam reforming tends to be favored and more prevalent.

As used herein the term "volatile reaction products" refers to vapor or gaseous non-polar organic species that were once present in a solid or liquid state as volatile feedstock components of a carbonaceous feedstock wherein their conversion or vaporization to the vapor or gaseous state was promoted by the process of hydrous devolatilization. Volatile reaction products may contain both, non-condensable species, and condensable species which are desirable for collection and refinement.

As used herein the term "flue gas" refers to a vapor or gaseous mixture containing varying amounts of nitrogen ($N_2$), carbon dioxide ($CO_2$), water ($H_2O$), and oxygen ($O_2$). Flue gas is generated from the thermochemical process of combustion.

As used herein the term a "thermochemical process" refers to a broad classification including various processes that can convert a carbonaceous feedstock into product gas. Among the numerous thermochemical processes or systems that can be considered for the conversion of a carbonaceous material, the present disclosure contemplates: hydrous devolatilization, steam reforming, partial oxidation, dry reforming, and combustion. Thermochemical processes may be either endothermic or exothermic in nature depending upon the specific set of processing conditions employed. Stoichiometry and composition of fluidization medium, type of fluidization medium, fluid bed temperature and pressure, heating rate of the feedstock, residence time, feedstock properties, and catalyst or bed additives all dictate what sub classification of thermochemical processing the system exhibits.

As used herein the term "thermochemical reactor" refers to a fluidization reactor that accepts a carbonaceous feedstock and converts it into one or more product gases.

As used herein the term "hydrous devolatilization" refers to an endothermic thermochemical process wherein volatile feedstock components of a carbonaceous feedstock are converted primarily into volatile reaction products in a steam and hydrogen environment; however some syngas can be generated. Typically this sub classification of a thermochemical process involves the use of steam as a fluidization medium and involves temperatures ranging from 320° C. and 569.99° C., depending upon the feedstock chemistry. Hydrous devolatilization permits release and thermochemical reaction of volatile feedstock components leaving the fixed carbon feedstock components mostly unreacted as dictated by kinetics.

As used herein the term "steam reforming" refers to a thermochemical process comprising a specific chemical reaction where steam reacts with a carbonaceous feedstock to yield syngas. The main reaction is endothermic wherein the operating temperature range is between 570 and 900° C., depending upon the feedstock chemistry.

As used herein the term "dry reforming" refers to a thermochemical process comprising a specific chemical reaction where carbon dioxide is used to convert a carbonaceous feedstock into syngas. By limiting the amount of water available, the main reaction is endothermic wherein the operating temperature range is between 600 and 1,000° C., depending upon the feedstock chemistry.

As used herein the term "partial oxidation" refers to a thermochemical process wherein substoichiometric oxidation of a carbonaceous feedstock takes place to generate syngas. By limiting the amount of oxygen available, the main reaction is exothermic wherein the operating temperature range is between 500 and 1400° C., depending upon the feedstock chemistry.

As used herein the term "combustion" refers to a thermochemical process wherein at least the stoichiometric oxidation of a carbonaceous feedstock takes place to generate flue gas.

SUMMARY

In accordance with one aspect of the present invention, the carbonaceous feedstock conversion system includes an integrated two-stage fluid bed thermochemical reaction apparatus having two reaction compartments side by side and physically partitioned from one another in one vessel sharing one or more clusters of horizontal or slanted heat pipes for efficient indirect heat transfer between first and second fluid bed reaction stages and materials therein. One reaction compartment within the reactor accepts a carbonaceous feedstock, comprised of volatile feedstock components and fixed carbon feedstock components, and continuously produces a product gas therefrom, while simultaneously and continuously capturing and transferring the fixed carbon feedstock components to a second compartment within the reactor where they may be continuously thermochemically reacted and converted into either syngas or flue gas.

In another aspect, the present invention is directed towards a continuous, energy-integrated refuse-to-crude oil conversion process and apparatus comprising the continuous hydrous devolatilization of volatile feedstock components and continuous thermochemical conversion of fixed carbon feedstock components.

BRIEF DESCRIPTION OF THE DRAWINGS

For a better understanding of the present invention and to show how the same may be carried out in practice, reference will now be made to the accompanying drawings, in which:

FIG. 6 shows a list of the combinations of thermochemical reaction regimes that can take place within each partitioned reaction compartment.

DETAILED DESCRIPTION

Figure 1:
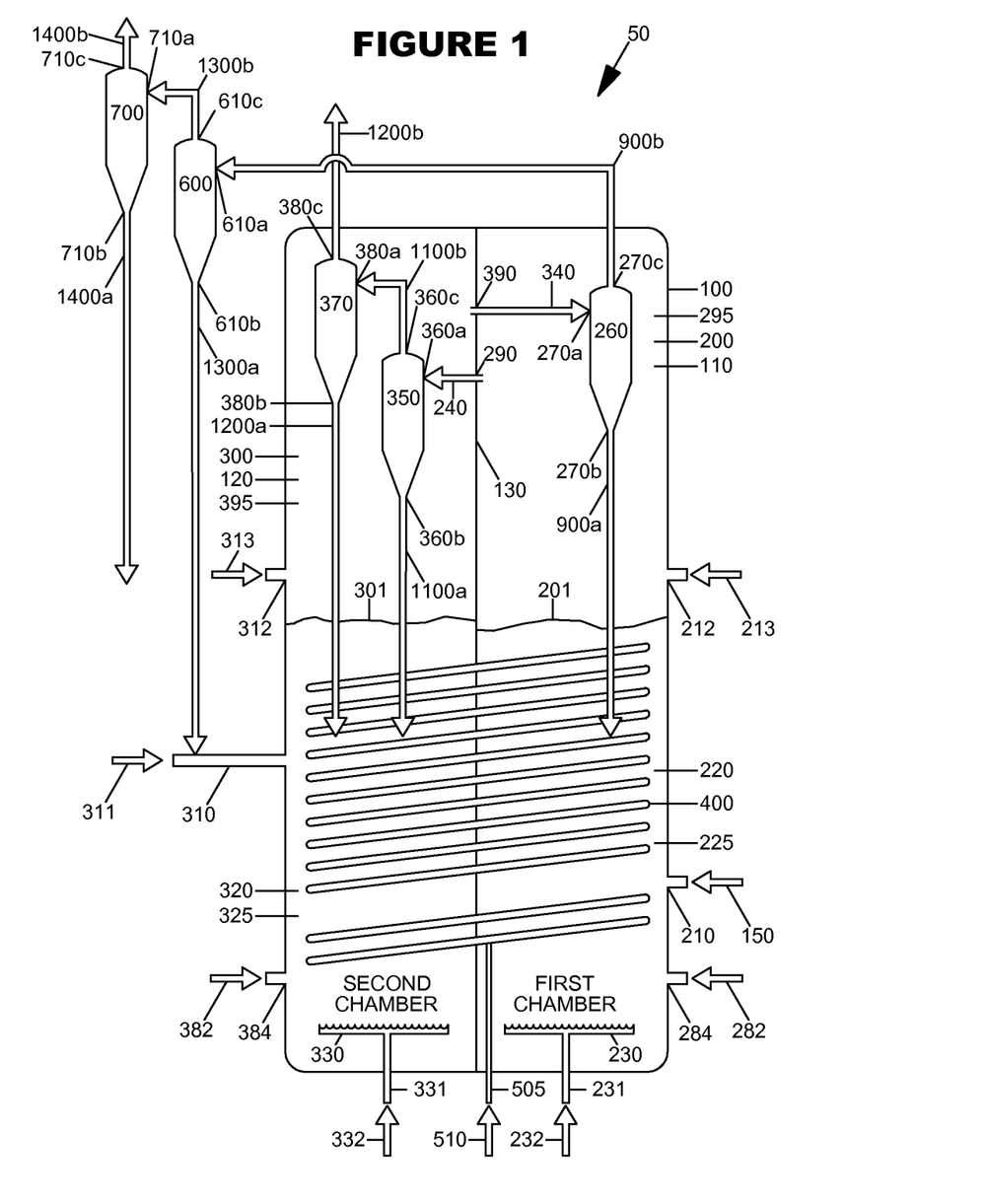
FIG. 1 shows an integrated two-stage thermochemical reactor apparatus in accordance with one embodiment of the present invention.

FIG. 1 shows an integrated two-stage fluid bed reactor (50) in accordance with one embodiment of the present invention. It includes a vessel (100) with a first chamber (110), a second chamber (120), and a partition (130) therebetween. The first chamber (110) defines a stage 1 reaction chamber (200). The second chamber (120) defines a stage 2 reaction chamber (300). A plurality of heat pipes (400) extend through the partition (130) between the first chamber (110) and the second chamber (120). Stage 1 reaction chamber (200) and stage 2 reaction chamber (300) are physically separated from one another by the partition (130) and share one or more horizontal or slanted clusters of heat pipes (400) which are used to transfer heat from the second chamber (120) to the first chamber (110). The stage 2 fluid bed (320) within the second chamber (120) generally operates at a higher temperature than the stage 1 fluid bed (220) within the first chamber (110).

As seen in FIG. 1, the partition (130) has a first partition passageway (290) for transferring first chamber discharge materials (240) from the stage 1 freeboard zone (295) to a stage 1 primary particulate capture device (350) located within the stage 2 freeboard zone (395). First chamber discharge materials (240) may include product gases, fixed carbon feedstock components, volatile feedstock components, bed media, ash, sorbents, bed material agglomeration prevention additives, catalysts, or combinations thereof. A second partition passageway (390) is configured for transferring second chamber discharge materials (340) from the stage 2 freeboard zone (395) to a stage 2 primary particulate capture device (260) located within the stage 1 freeboard zone (295). Second chamber discharge materials (340) may include product gases, fixed carbon feedstock components, volatile feedstock components, bed media, ash, sorbents, bed material agglomeration prevention additives, catalysts, or combinations thereof.

The first and second chamber discharge materials (240, 340) will depend on the exact nature of the thermochemical process conducted in each chamber. For example, in operational embodiment (1001) of FIG. 6, the first chamber (110) is operated in a hydrous devolatilization mode and the second chamber (120) is operated in a partial oxidation steam reforming mode. In such case, the first chamber discharge materials sent to the second chamber (120) will include volatile reaction products, bed media, ash, fixed carbon feedstock components, and volatile feedstock components while the second chamber discharge materials returned to the first chamber (110) will include syngas and bed media but only trace amounts of fixed carbon feedstock components and volatile feedstock components. Thus, in operational embodiment (1001) of FIG. 1, the first chamber discharge materials are substantially carbon-laden while the second chamber discharge materials are substantially carbon-depleted.

Figure 2:
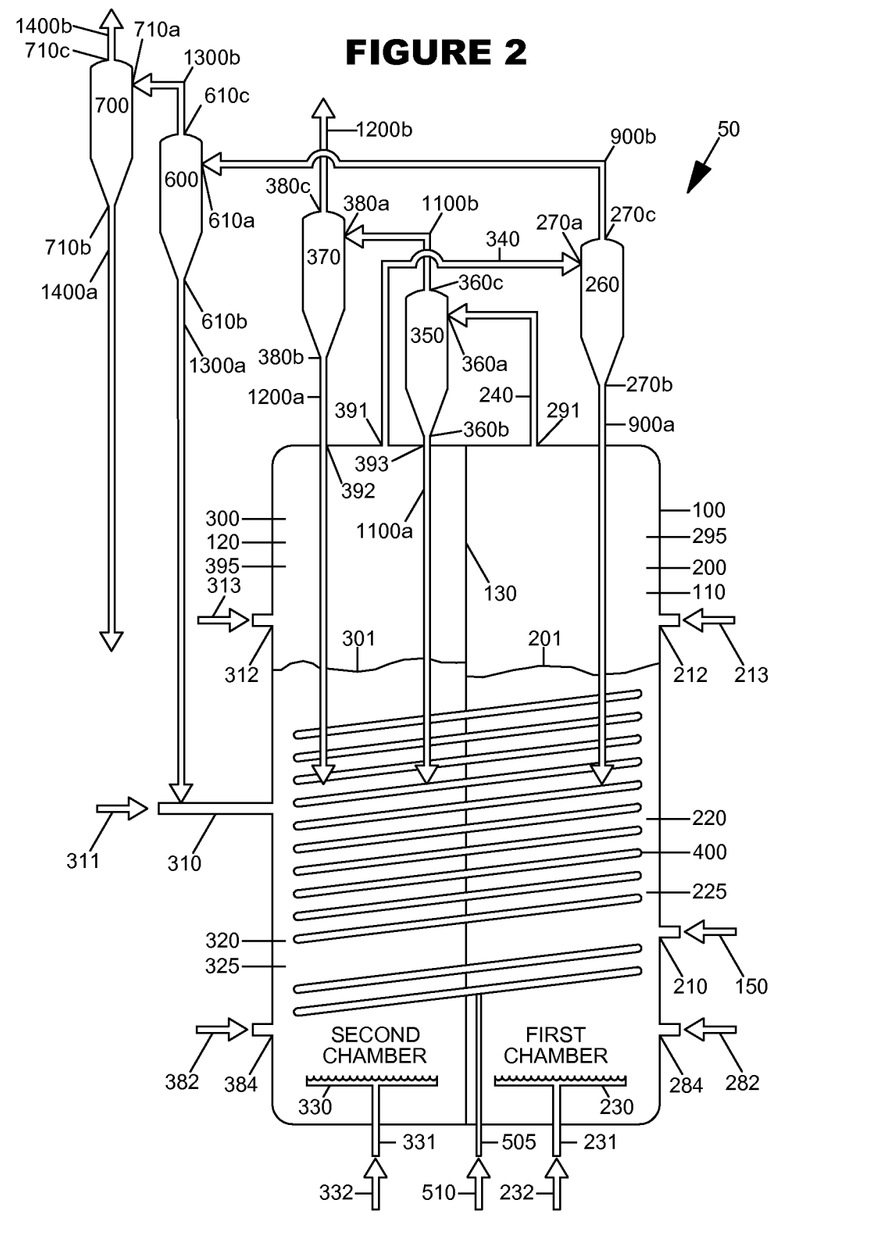
FIG. 2 shows an integrated two-stage thermochemical reactor apparatus in accordance with another embodiment of the present invention.

In an alternative embodiment, as seen in FIG. 2, an alternate first passageway (291) through the exterior wall of the vessel (100) is used for transferring first chamber discharge materials (240) from the stage 1 freeboard zone (295) to a stage 1 primary particulate capture device (350) located external to the vessel (100). An accompanying alternate second passageway (391) through the exterior wall of the vessel (100) may be used for transferring second chamber discharge materials (340) from the stage 2 freeboard zone (395) to a stage 2 primary particulate capture device (260) located external to the vessel (100).

As seen in FIG. 1 and FIG. 2, the first chamber (110) includes a: feedstock inlet port (210) for receiving carbonaceous feedstock (150); a stage 1 freeboard zone fluid inlet port (212) for introducing a stage 1 freeboard zone fluid (213) including, but not limited to, an oxidant, such as carbon dioxide, oxygen, air, and steam or a mixture thereof; a stage 1 fluid bed (220) with stage 1 fluid bed material (225); a stage 1 fluidization medium inlet port (231) located near the bottom of the stage 1 reaction chamber (200) for introducing a stage 1 fluidization medium (232); a stage 1 fluidization medium distributor (230) which substantially evenly distributes the stage 1 fluidization medium (232) over the cross sectional area of the stage 1 reaction chamber (200); a stage 1 secondary material inlet port (284) for introducing a stage 1 secondary material (282) comprised of a sorbent, bed material agglomeration prevention additive, or catalyst; and a stage 1 freeboard zone (295) located above the stage 1 fluid bed level (201). The stage 1 fluidization medium (232) may be one or more from the group consisting of steam, carbon dioxide, air, oxygen, hydrogen, syngas, and product gas, and mixtures thereof.

The first chamber (110) further includes a stage 2 primary particulate capture device (260), such as a cyclone, which includes an inlet (270a), a particulate discharge (270b), and a product gas discharge (270c). Stage 2 primary particulate capture device (260) may be located internally to the vessel (100) as in FIG. 1, or, externally to the vessel (100) with connections as shown in FIG. 2.

The stage 2 primary particulate capture device (260) accepts second chamber discharge materials (340) from stage 2 freeboard zone (395), separates first particulates (900a) therefrom, and said separated first particulates exit stage 2 primary particulate capture device (260) through a particulate discharge (270b) and are transferred to the stage 1 fluid bed (220). First particulates (900a) are most likely to be carbon-depleted fluidized bed material and may include fixed carbon feedstock components, ash, sorbent, catalyst, agglomeration prevention additives, or mixtures thereof.

The stage 2 secondary particulate capture device (600) includes: an inlet (610a); a particulate discharge (610b); and, a product gas discharge (610c). First product gas (900b) is discharged from stage 2 primary particulate capture device (260) through a product gas discharge (270c) and enters stage 2 secondary particulate capture device (600) through inlet (610a). Fourth particulates (1300a) including fixed carbon feedstock components are separated within stage 2 secondary particulate capture device (600) and are discharged through a particulate discharge (610b) either for return to the second chamber (120) or for ash storage and collection. A fourth product gas (1300b) is discharged from the stage 2 secondary particulate capture device (600) through a product gas discharge (610c).

The optional stage 2 tertiary particulate capture device (700) includes: an inlet (710a); a particulate discharge (710b); and, a product gas discharge (710c). The fourth product gas (1300b) discharged from stage 2 secondary particulate capture device (600) through the product gas discharge (610c) enters the stage 2 tertiary particulate capture device (700) through inlet (710a). Fifth particulates (1400a), including ash, are separated within the stage 2 tertiary particulate capture device (700) and are discharged through a particulate discharge (710b). A fifth product gas (1400b) is discharged from the stage 2 tertiary particulate capture device (700) through a product gas discharge (710c). Devices 260, 600 and 700 handle progressively finer and lighter solids with device 700 discharging mostly ash laden solids. Depending on the feedstock and the application, either two cyclones in series (260 and 600) arrangement or three cyclones in series (260, 600 and 700) arrangement may be used.

As seen in FIGS. 1 and 2, the stage 2 reaction chamber (300) includes a stage 2 fluid bed (320) with stage 2 fluid bed material (325). A stage 2 fluidization medium inlet port (331) is located near the bottom of the stage 2 reaction chamber (300) for introducing a stage 2 fluidization medium (332). A stage 2 fluidization medium distributor (330) substantially evenly distributes the stage 2 fluidization medium (332) over the cross sectional area of the stage 2 reaction chamber (300). The stage 2 fluidization medium (332) may be one or more from the group consisting of steam, carbon dioxide, air, oxygen, hydrogen, syngas, and product gas. A stage 2 secondary material inlet port (384) is configured to introduce a stage 2 secondary material (382) comprised of one or more of sorbent, bed material agglomeration prevention additive, catalyst, tail-gas, syngas, tars, a hydrocarbon liquid, oil and solvent. A stage 2 freeboard zone (395) is located above the stage 2 fluid bed level (301) and is configured to accept a stage 2 freeboard zone fluid (313) comprised of one or more of oxygen, air, steam, and carbon dioxide introduced through a stage 2 freeboard zone fluid inlet port (312). A stage 2 fluid bed fluid injection port (310) is configured to introduce a stage 2 fluid bed zone fluid (311) comprised of one or more of steam, carbon dioxide, or nitrogen as necessary and/or particulates (1300a) comprised primarily of fixed carbon feedstock components.

The second chamber (120) further includes: a stage 1 primary particulate capture device (350), such as a cyclone; and a stage 1 secondary particulate capture device (370), such as a cyclone. Each said particulate capture device, i.e., (350) and/or (370), may be located external to the vessel (100) as depicted in FIG. 2, or located within the stage 2 freeboard zone (395) and thus internal to the vessel (100) as depicted in FIG. 1.

The stage 1 primary particulate capture device (350) includes: an inlet (360a); a particulate discharge (360b); and, a product gas discharge (360c). First chamber discharge materials (240) comprised of product gas, bed material, fixed carbon feedstock components, volatile feedstock components, and/or ash are discharged from stage 1 freeboard zone (295) and transferred through first partition passageway (290) to inlet (360a). Second particulates (1100a) including at least one of fixed carbon feedstock components, volatile feedstock components, bed material, and/or ash are separated within the stage 1 primary particulate capture device (350) and discharged through particulate discharge (360b) and transferred to the stage 2 fluid bed (320).

The stage 1 secondary particulate capture device (370) includes: an inlet (380a); a particulate discharge (380b); and, a product gas discharge (380c). Second product gas (1100b) is discharged from the stage 1 primary particulate capture device (350) through a product gas discharge (360c) and enters stage 1 secondary particulate capture device (370) through inlet (380a).

Third particulates (1200a) including bed media, fixed carbon feedstock components, volatile feedstock components, and/or ash are separated within stage 1 secondary particulate capture device (370) and are transferred to stage 2 fluid bed (320) through particulate discharge (380b). A third product gas (1200b) is discharged from stage 1 secondary particulate capture device (370) through product gas discharge (380c). Devices 350 and 370 provide two stages of solids separation to discharge a product gas substantially lower in particulates. This arrangement facilitates the transfer of carbon-laden solids from the first chamber (110) to the second chamber (120), reacting fixed carbon feedstock components in the second chamber (120) at a higher temperature and returning the carbon-depleted solids to the first chamber (110).

Figure 3:
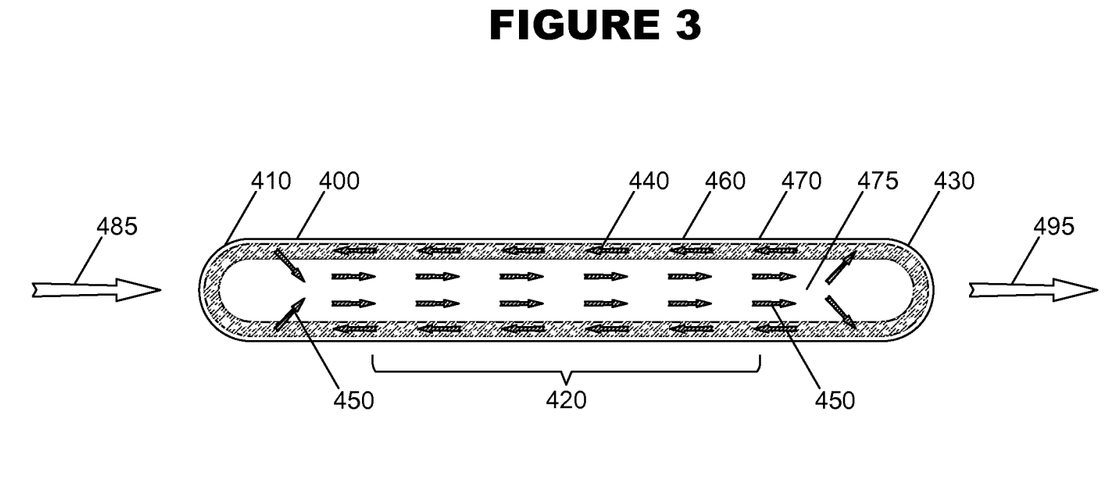
FIG. 3 shows an embodiment of a heat pipe used in the integrated two-stage thermochemical reactor apparatus.

FIG. 3 shows a detailed view of one embodiment of a heat pipe of the sort that may be employed in the present invention. The construction and design of a suitable heat pipe is described generally at http://www.thermacore.com/thermal-basics/heat-pipe-technology.aspx, retrieved Jan. 15, 2013, and available from Thermacore of Lancaster, Pa., USA. Each heat pipe (400) includes an evaporation portion (410), an adiabatic portion (420), a condensation portion (430), a wick internal structure (440), a heat carrier fluid (450), a heat transfer surface (470), and a vapor space (475). In one embodiment, the heat carrier fluid comprises sodium, potassium, lithium, cesium, or a mixture thereof. In another embodiment, the wick internal structure (440) may be comprised of a porous capillary type structure, metal gauze, capillary grooves, a system of arteries, a combination thereof, or the like. In another embodiment, the entire heat transfer surface (470) of the heat pipe (400) is contiguous with an intermetallic hydrogen diffusion impermeable coating (460), or barrier layer, prepared from metals selected from copper, chromium, zirconium, yttrium, partially stabilized zirconium, platinum, iridium, lanthanum, rhodium, and compounds, mixtures, alloys, and intermetallic compounds thereof.

Figure 4:
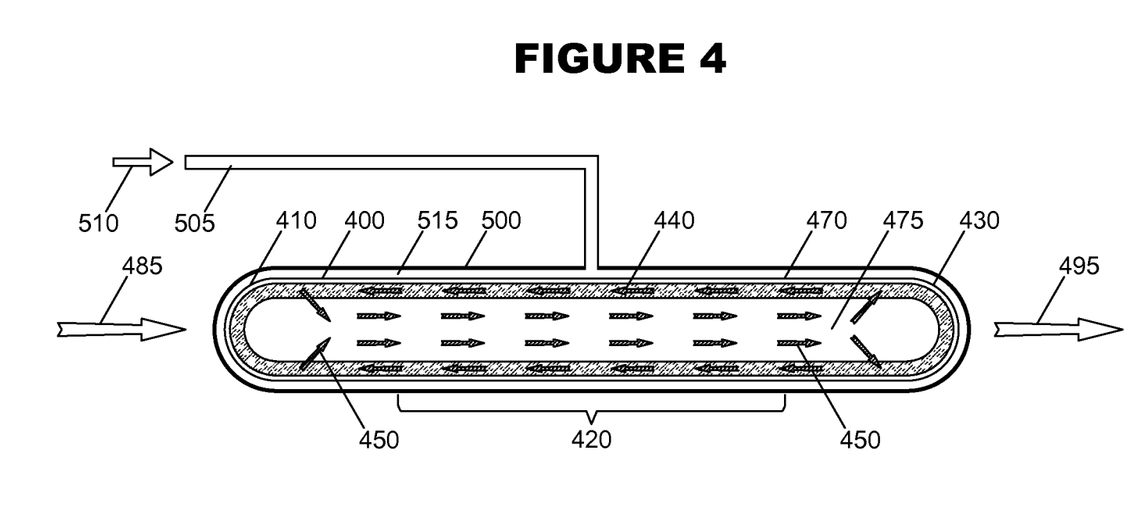
FIG. 4 shows another embodiment of a heat pipe used in the integrated two-stage thermochemical reactor apparatus.

FIG. 4 shows a detailed view of another embodiment of a heat pipe of the sort that may be employed in the present invention. It includes features present in FIG. 3, however, the entire heat pipe (400) is placed within a sealed thermowell (500) which may be purged or pressurized with a gas (510) that is transferred through a gas injection port (505).

Hydrogen diffusion into the heat pipe (400) may be mediated by making a gas (510) available to the space (515) in between the heat pipe's heat transfer surface (470) and the thermowell (500). Preferred gases for this application may be nitrogen, carbon dioxide, helium, argon, steam or the like.

The evaporation portion (410) is configured to accept a heat input (485) which vaporizes the heat carrier fluid (450). The adiabatic portion (420) is configured to enable the vaporized heat carrier fluid (450) to travel to the condensation portion (430) through the vapor space (475). The condensation portion (430) is configured to release a heat output (495) which in turn permits condensation of the vaporized heat carrier fluid (450). The wick internal structure (440) is configured to return the condensed heat carrier fluid (450) from the condensation portion (430) to the evaporation portion (410).

The evaporation portion (410) of each of the heat pipes (400) is situated in the second chamber (120). The condensation portion (430) of each heat pipe (400) is situated in the first chamber (110). As best seen in FIG. 1 and FIG. 2, the heat pipe (400) configuration preferably extends at a downward angle (e.g., 5 to 30 degrees with respect to the horizontal) from the first chamber (110) to the second chamber (120). This non-limiting embodiment is preferred since gravity flow assists the return of the condensed heat carrier fluid (450) from the condensation portion (430) to the evaporation portion (410).

Figure 5:
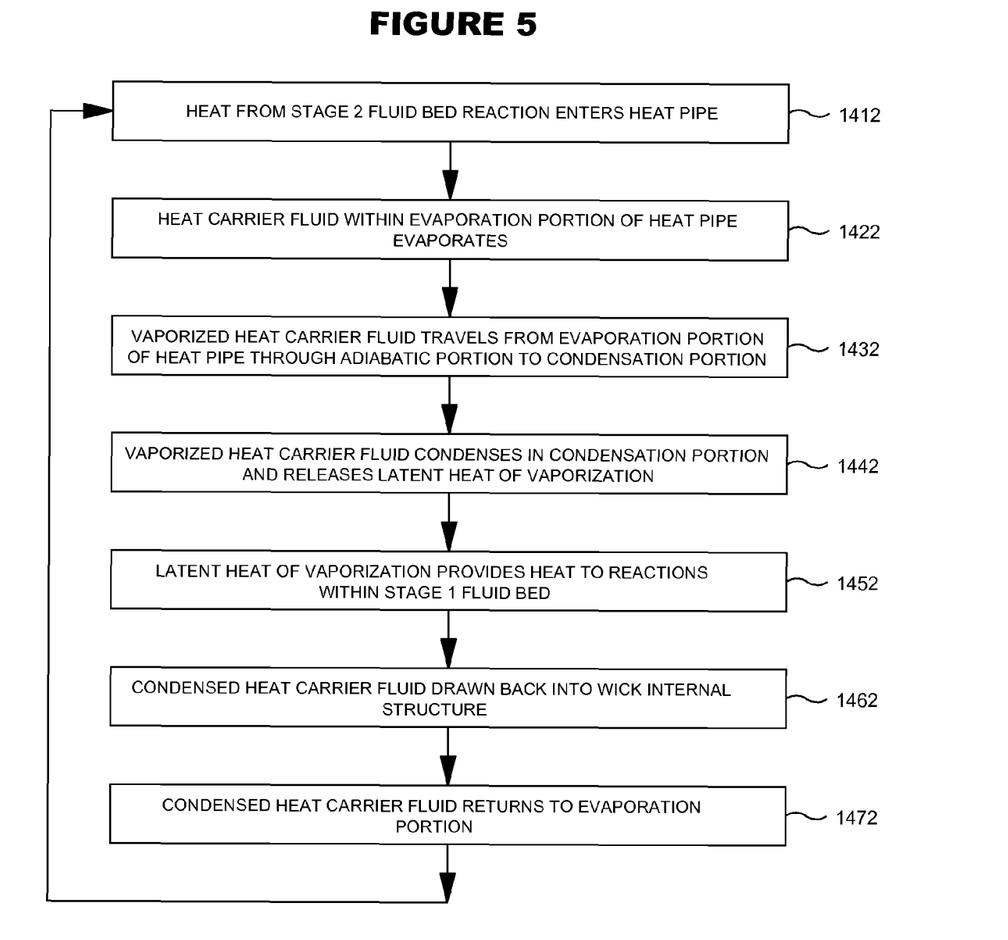
FIG. 5 shows an embodiment of a method of heat pipe operation.

FIG. 5 presents a flow chart depicting one embodiment of the operation of the stage 1 reaction chamber (200), stage 2 reaction chamber (300), and the heat pipes (400) in the vessel (100). The stage 1 reaction chamber (200) receives carbonaceous feedstock (150) and converts at least a portion of that carbonaceous feedstock (150) into first chamber discharge materials (240) in an endothermic process. The stage 1 reaction chamber (200) may operate in one or more reaction regimes/modes such as hydrous devolatilization, steam reforming, dry reforming and partial oxidation utilizing primarily endothermic reactions with supplementary exothermic reactions as necessary. The stage 2 reaction chamber (300) receives the first chamber discharge materials (240) from the stage 1 reaction chamber (200) via the first partition passageway (290).

The stage 2 reaction chamber (300) may operate in one or more reaction modes such as steam reforming, dry reforming, partial or full oxidation (i.e. combustion) utilizing primarily exothermic reactions with supplementary endothermic reactions. The heat produced from the reaction in the stage 2 reaction chamber (300) enters the heat pipe (400) at its evaporation portion (410) (Step 1412). Heat released from the reaction causes the heat carrier fluid (450) within the evaporation portion (410) of the heat pipe (400) to evaporate (vaporize) (Step 1422). The vaporized heat carrier fluid (450) creates a pressure gradient which forces the heat carrier fluid (450) toward the condensation portion (430). The vaporized heat carrier fluid (450) travels through the vapor space (475) of the adiabatic portion (420) to the condensation portion (430) (Step 1432). The pressure drop in the heat pipe (400) is low, therefore little temperature change and thus minimal energy loss is associated with the adiabatic portion (420). The vaporized heat carrier fluid (450) condenses in the condensation portion (430) and releases its latent heat of vaporization into the stage 1 reaction chamber (200) (Step 1442). This provides the heat necessary for the endothermic reactions to occur in the stage 1 reaction chamber (200) (Step 1452). The condensed heat carrier fluid (450) is drawn into the pores of the wick internal structure (440) to return to the evaporation portion (410) (Step 1462). The wick internal structure (440) uses capillary pressure to return the heat carrier fluid (450) to the evaporation portion (410) (Step 1472). The wick internal structure (440) also acts as an extended surface to allow higher heat fluxes in the heat pipe (400). The endothermic and/or exothermic reactions in the stage 1 reaction chamber (200) and the stage 2 reaction chamber (300) continually occur, with heat continually transferring from the stage 2 reaction chamber (300) to the stage 1 reaction chamber (200) via the heat pipes (400).

FIG. 6 presents a number of embodiments capable of being implemented using the system disclosed herein. Each row of the table in FIG. 6 presents combinations of thermochemical reaction regimes that can take place within each side by side chamber. It is understood that the corresponding elements and features necessary to realize each combination would be needed in a system.

The disclosed process can be configured by the formulator to meet the desired need. The disclosed process provides several unmet advantages to convert varying types of carbonaceous feedstocks into valuable end products.

Although the present invention has been described with reference to certain embodiments, it should be understood that various alterations and modifications could be made without departing from the spirit or scope of the invention as hereinafter claimed.

TABLE OF REFERENCE NUMERALS integrated two-stage fluid bed reactor (50)
vessel (100)
first chamber (110)
second chamber (120)
partition (130)
carbonaceous feedstock (150)
stage 1 reaction chamber (200)
stage 1 fluid bed level (201)
feedstock inlet port (210)
stage 1 freeboard zone fluid inlet port (212)
stage 1 freeboard zone fluid (213)
stage 1 fluid bed (220)
stage 1 fluid bed material (225)
stage 1 fluidization medium distributor (230)
stage 1 fluidization medium inlet port (231)
stage 1 fluidization medium (232)
first chamber discharge materials (240)
stage 2 primary particulate capture device (260)
inlet (270a)
particulate discharge (270b)
product gas discharge (270c)
stage 1 secondary material (282)
stage 1 secondary material inlet port (284)
first partition passageway (290)
alternate first passageway (291)
stage 1 freeboard zone (295)
stage 2 reaction chamber (300)
stage 2 fluid bed level (301)
stage 2 fluid bed fluid injection port (310)
stage 2 fluid bed zone fluid (311)
stage 2 freeboard zone fluid inlet port (312)
stage 2 freeboard zone fluid (313)
stage 2 fluid bed (320)
stage 2 fluid bed material (325)
stage 2 fluidization medium distributor (330)
stage 2 fluidization medium inlet port (331)
stage 2 fluidization medium (332)
second chamber discharge materials (340)
stage 1 primary particulate capture device (350)
inlet (360a)
particulate discharge (360b)
product gas discharge (360c)
stage 1 secondary participate capture device (370)
inlet (380a)
particulate discharge (380b)

-continued

TABLE OF REFERENCE NUMERALS product gas discharge (380c)
stage 2 secondary material (382)
stage 2 secondary material inlet port (384)
second partition passageway (390)
alternate second passageway (391)
particulates return passageway (392)
particulates return passageway (393)
stage 2 freeboard zone (395)
heat pipes (400)
evaporation portion (410)
adiabatic portion (420)
condensation portion (430)
wick internal structure (440)
heat carrier fluid (450)
hydrogen diffusion impermeable coating (460)
heat transfer surface (470)
vapor space (475)
heat input (485)
heat output (495)
thermowell (500)
gas injection port (505)
gas (510)
space (515)
stage 2 secondary particulate capture device (600)
inlet (610a)
particulate discharge (610b)
product gas discharge (610c)
stage 2 tertiary particulate capture device (700)
inlet (710a)
particulate discharge (710b)
product gas discharge (710c)
first particulates (900a)
first product gas (900b)
second particulates (1100a)
second product gas (1100b)
third particulates (1200a)
third product gas (1200b)
fourth particulates (1300a)
fourth product gas (1300b)
fifth particulates (1400a)
fifth product gas (1400b)
Step 1412
Step 1422
Step 1432
Step 1442
Step 1452
Step 1462
Step 1472

What is claimed is:

1. An integrated two-stage fluid bed reactor (50) comprising:
a vessel (100) having a longitudinal axis and a partition (130) extending along the longitudinal axis and separating the vessel (100) into a first chamber (110) and a second chamber (120) arranged side-by-side;
the first chamber (110) defining a stage 1 reaction chamber (200) having a stage 1 fluid bed (220) operating primarily in an endothermic reaction regime;
the second chamber (120) defining a stage 2 reaction chamber (300) having a stage 2 fluid bed (320) operating primarily in an exothermic reaction regime;
a plurality of heat pipes (400) passing through the partition (130) and extending between the first chamber (110) and the second chamber (120), the heat pipes (400) configured to remove heat from the second chamber (120) and provide heat to the first chamber (110);
a first passageway (290, 291) configured to transfer first chamber discharge materials (240) from a stage 1 freeboard zone (295) of the first chamber (110) to the second chamber (120) via a stage 1 primary particulate capture device (350); and,
a second passageway (390, 391) configured to transfer second chamber discharge materials (340) from a stage 2 freeboard zone (395) of the second chamber (120) to the first chamber (110) via a stage 2 primary particulate capture device (260).

2. The integrated two-stage fluid bed reactor (50) according to claim 1, wherein:
the stage 2 primary particulate capture device (260) is configured to:
receive said second chamber discharge materials (340) from the second chamber (120);
transfer first particulates (900a) to the stage 1 fluid bed (220) in the first chamber; and,
output a first product gas (900b); and
the stage 1 primary particulate capture device (350) is configured to:
receive said first chamber discharge materials (240) from the first chamber (110);
transfer second particulates (1100a) to the stage 2 fluid bed (320) in the second chamber (120); and
output a second product gas (1100b).

3. The integrated two-stage fluid bed reactor (50) according to claim 2, further comprising:
a stage 1 secondary particulate capture device (370) configured to:
receive the second product gas (1100b) from the stage 1 primary particulate capture device (350);
output third particulates (1200a) to the stage 2 fluid bed (320) in the second chamber (120); and,
output a third product gas (1200b).

4. The integrated two-stage fluid bed reactor (50) according to claim 3, further comprising:
a stage 2 secondary particulate capture device (600) configured to:
receive the first product gas (900b) from the stage 2 primary particulate capture device (260);
output a fourth product gas (1300b); and
output fourth particulates (1300a).

5. The integrated two-stage fluid bed reactor (50) according to claim 4, wherein at least a portion of the fourth particulates (1300a) are introduced into the second chamber (120).

6. The integrated two-stage fluid bed reactor (50) according to claim 4 further comprising:
a stage 2 tertiary particulate capture device (700) configured to:
receive the fourth product gas (1300b) from the stage 2 secondary particulate capture device (600);
output a fifth product gas (1400b); and
output fifth particulates (1400a).

7. The integrated two-stage fluid bed reactor (50) according to claim 3 wherein
the stage 1 primary particulate capture device (350) and the stage 1 secondary particulate capture device (370) are both located within second chamber (220).

8. The integrated two-stage fluid bed reactor (50) according to claim 3, wherein
the stage 1 primary particulate capture device (350) and the stage 1 secondary particulate capture device (370) are both located external to the vessel (100); and,
a particulates return passageway (392) connects the stage 1 secondary particulate capture device (370) to the stage 2 fluid bed (320) to transfer third particulates (1200a) to the stage 2 fluid bed (320).

9. The integrated two-stage fluid bed reactor (50) according to claim 2, further comprising:

a stage 2 secondary particulate capture device (600) configured to:
  receive the first product gas (900b) from the stage 2 primary particulate capture device (260);
  output a fourth product gas (1300b); and
  output fourth particulates (1300a).

10. The integrated two-stage fluid bed reactor (50) according to claim 9, wherein at least a portion of the fourth particulates (1300a) are introduced into the second chamber (120).

11. The integrated two-stage fluid bed reactor (50) according to claim 9, further comprising:
  a stage 2 tertiary particulate capture device (700) configured to:
    receive the fourth product gas (1300b) from the stage 2 secondary particulate capture device (600);
    output a fifth product gas (1400b); and
    output fifth particulates (1400a).

12. The integrated two-stage fluid bed reactor (50) according to claim 2, wherein:
  the stage 1 primary particulate capture device (350) is located within the second chamber (120);
  the stage 2 primary particulate capture device (260) is located within the first chamber (110);
  the first passageway (290) passes through the partition (130) to connect the first chamber (110) to the stage 1 primary particulate capture device (350) located within the second chamber (120); and,
  the second passageway (390) passes through the partition (130) to connect the second chamber (120) to the stage 2 primary particulate capture device (260) located within the first chamber (110).

13. The integrated two-stage fluid bed reactor (50) according to claim 2, wherein:
  the stage 1 primary particulate capture device (350) is located external to the second chamber (120) and the vessel (100);
  the stage 2 primary particulate capture device (260) is located external to the first chamber (110) and the vessel (100);
  the first passageway (291) does not pass through the partition (130) to connect the first chamber (110) to the stage 1 primary particulate capture device (350) located external to the vessel (100); and,
  the second passageway (391) does not pass through the partition (130) to connect the second chamber (120) to the stage 2 primary particulate capture device (260) located external to the vessel (100).

14. The integrated two-stage fluid bed reactor (50) according to claim 2, wherein:
  the stage 1 primary particulate capture device (350) is located within the second chamber (120);
  the stage 2 primary particulate capture device (260) is located external to the first chamber (110) and the vessel (100);
  the first passageway (290) passes through the partition (130) to connect the first chamber (110) to the stage 1 primary particulate capture device (350) located within second chamber (220); and
  the second passageway (391) does not pass through the partition (130) to connect the second chamber (120) to the stage 2 primary particulate capture device (260) located external to the vessel (100).

15. The integrated two-stage fluid bed reactor (50) according to claim 2, wherein:

the stage 1 primary particulate capture device (350) is located external to the second chamber (120) and the vessel (100);
the stage 2 primary particulate capture device (260) is located within the first chamber (110);
the first passageway (291) does not pass through the partition to connect the first chamber (110) to the stage 1 primary particulate capture device (350) located external to the vessel (100); and,
the second passageway (390) passes through the partition (130) to connect the second chamber (120) to the stage 2 primary particulate capture device (260) located within first chamber (110).

16. The integrated two-stage fluid bed reactor (50) according to claim 1, wherein:
  the second chamber (120) comprises a stage 2 freeboard zone fluid inlet port (312) configured to introduce at least one of steam, carbon dioxide, oxygen, or air, into the stage 2 freeboard zone (395) within the second chamber (120); and
  the first chamber (110) comprises a stage 1 freeboard zone fluid inlet port (212) configured to introduce at least one of steam, carbon dioxide, oxygen, or air, into the stage 1 freeboard zone (295) within the first chamber (110).

17. The integrated two-stage fluid bed reactor (50) according to claim 1, wherein:
  the second chamber (120) further comprises a stage 2 secondary material inlet port (384) configured to introduce a stage 2 secondary material (382) into the stage 2 fluid bed (320), the stage 2 secondary material (382) comprising at least one from the group consisting of a sorbent, bed material agglomeration prevention additive, catalyst, tail-gas, syngas, tars, a hydrocarbon liquid, oil and a solvent.

18. The integrated two-stage fluid bed reactor (50) according to claim 1, wherein:
  the first chamber (110) further comprises a stage 1 secondary material inlet port (284) configured to introduce a stage 1 secondary material (282) into the stage 1 fluid bed (220), the stage 2 secondary material (282) comprising at least one from the group consisting of a sorbent, bed material agglomeration prevention additive, and catalyst.

19. The integrated two-stage fluid bed reactor (50) of claim 1, wherein:
  the first chamber (110) further comprises a stage 1 fluidization medium inlet port (231) configured to introduce a stage 1 fluidization medium (232) into the first chamber (110), the stage 1 fluidization medium (232) comprising at least one from the group consisting of steam, carbon dioxide, air, oxygen, hydrogen, syngas, and product gas, and mixtures thereof; and
  the second chamber (120) further comprises a stage 2 fluidization medium inlet port (331) configured to introduce a stage 2 fluidization medium (332) into the second chamber (120), the stage 2 fluidization medium (332) comprising at least one from the group consisting of steam, carbon dioxide, air, oxygen, hydrogen, syngas, and product gas, and mixtures thereof.

20. The integrated two-stage fluid bed reactor (50) of claim 1, wherein:
  each of the heat pipes (400) is within a sealed thermowell (500) configured to be purged or pressurized with a gas (510) that is introduced via a gas injection port (505).

21. A feedstock conversion process for simultaneously producing volatile reaction products and syngas or flue gas from a carbonaceous feedstock, the process comprising:
- providing a vessel (100) having a longitudinal axis and a partition (130) extending along the longitudinal axis and separating the vessel (100) into a first chamber (110) having a first bed and a first freeboard region, and a second chamber (120) having a second bed and a second freeboard region;
- subjecting, in the first chamber (110), the carbonaceous feedstock to a first indirectly-heated endothermic reforming process operating under a first set of processing conditions to produce a first mixed stream containing syngas and unreacted fixed carbon and residual volatile feedstock components;
- separating unreacted feedstock components present in the first freeboard region from the syngas and transferring said unreacted feedstock components to the second chamber;
- subjecting, in the second chamber (120), the separated unreacted feedstock components to a partial or full exothermic process operating under a second set of processing conditions to produce a stream containing syngas or flue gas; and,
- transferring heat generated from the exothermic process in the second chamber (120) through heat pipes to further promote the first endothermic reforming process in the first chamber (110).

22. A feedstock conversion process for simultaneously producing volatile reaction products and syngas or flue gas from a carbonaceous feedstock, the process comprising:
- subjecting the carbonaceous feedstock, in a first chamber, to a first indirectly-heated endothermic hydrous devolatilization process operating under a first set of processing conditions including a temperature between 320° C. and 569.99° C., to produce first chamber discharge materials containing unreacted fixed carbon and residual volatile feedstock components in the form of particulates present in a first freeboard region of the first chamber, as well as a product gas comprised of volatile reaction products;
- separating unreacted feedstock component particulates from the volatile reaction products and transferring said unreacted feedstock component particulates to a second chamber;
- subjecting the separated and transferred unreacted feedstock component particulates to a partial or full exothermic process operating under a second set of processing conditions to produce second chamber discharge materials containing syngas or flue gas in a freeboard region of a second chamber;
- transferring at least a portion of said second chamber discharge materials back to the first chamber; and
- transferring heat generated from the second exothermic process through heat pipes to promote the first endothermic hydrous devolatilization process.

\* \* \* \* \*